United States Patent

Eto et al.

[15] 3,647,948

[45] Mar. 7, 1972

[54] CHROMINANCE SIGNAL GENERATOR HAVING STRIPED FILTER

[72] Inventors: Yoshizumi Eto, Hachioji; Masao Hibi, Kodaira, both of Japan

[73] Assignee: Hitachi, Ltd., Tokyo, Japan

[22] Filed: Apr. 2, 1970

[21] Appl. No.: 25,207

[30] Foreign Application Priority Data

Apr. 4, 1969 Japan....................................44/25544
Apr. 4, 1969 Japan....................................44/25545

[52] U.S. Cl...........................................................178/5.4 ST
[51] Int. Cl...........................................................H04n 9/06
[58] Field of Search...................................178/5.4 ST, 5.4 R

[56] References Cited

UNITED STATES PATENTS 3,378,633 4/1968 Macovski..........................178/5.4 ST
3,419,672 12/1968 Macovski..........................178/5.4 ST
3,504,606 4/1970 Macovski..........................178/5.4 ST

*Primary Examiner*—Robert L. Richardson
*Attorney*—Craig, Antonelli, Stewart & Hill

[57] ABSTRACT

A chrominance signal generator comprising two striped filter elements for generating three primary color signals, red and blue signals of which have different frequency, delay circuit means for delaying a part of the composite electric signal derived from said filter elements for one horizontal scanning period, signal processing circuit means including an adder and a subtractor for processing the output signal of said delay circuit and said composite electric signal to obtain the three primary color signals, utilizing the vertical correlation of an image.

13 Claims, 21 Drawing Figures

FIG. 1
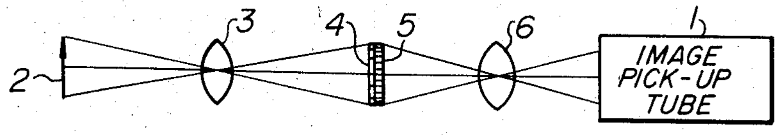
FIG. 2
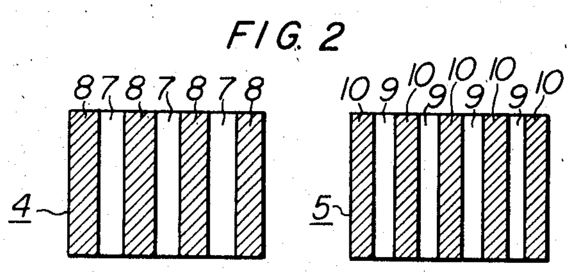
FIG. 3
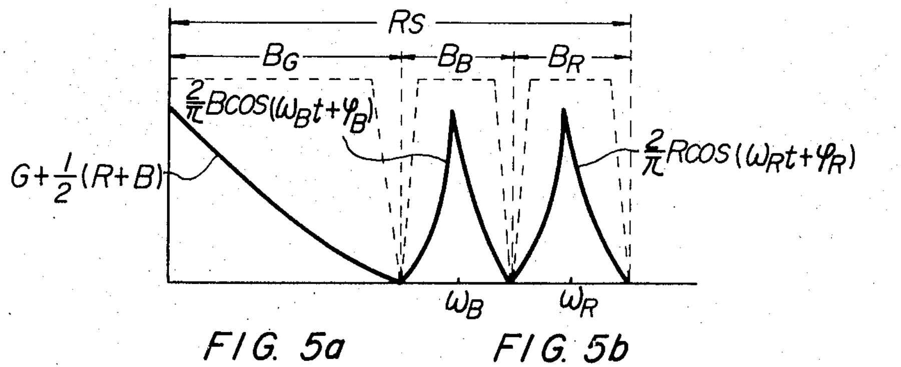
FIG. 5a FIG. 5b
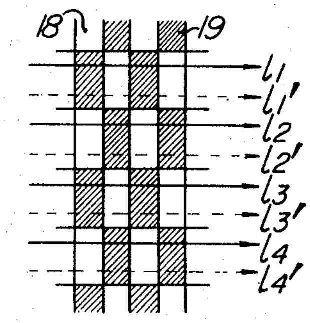
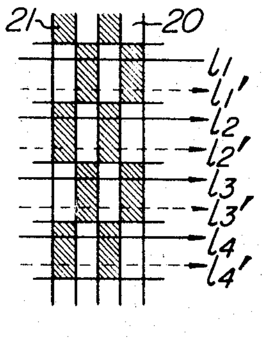
INVENTORS
YOSHIZUMI ETO and MASAO HIBI
BY Craig, Antonelli, Stewart & Hill
ATTORNEY

INVENTORS

YOSHIZUMI ETO and MASAO HIBI

BY Craig, Antonelli, Stewart & Hill

ATTORNEYS

INVENTORS
YOSHIZUMI ETO and MASAO HIBI
BY Craig, Antonelli, Stewart & Hill
ATTORNEYS

INVENTORS

YOSHIZUMI ETO and MASAO HIBI

BY Craig, Antonelli, Stewart & Hill
ATTORNEYS

INVENTORS

YOSHIZUMI ETO and MASAO HIBI

BY Craig, Antonelli, Stewart & Hill
ATTORNEYS

INVENTORS

YOSHIZUMI ETO and MASAO HIBI

BY Craig, Antonelli, Stewart & Hill
ATTORNEYS

INVENTORS

YOSHIZUMI ETO and MASAO HIBI

BY Craig, Antonelli, Stewart & Hill
ATTORNEYS

INVENTORS

YOSHIZUMI ETO and MASAO HIBI

BY Craig, Antonelli, Stewart & Hill
ATTORNEYS

CHROMINANCE SIGNAL GENERATOR HAVING STRIPED FILTER

This invention relates to chrominance signal generators and more particularly to a chrominance signal generator utilizing stripe or lattice-shaped filtering elements to generate a composite chrominance signal which is then separated into individual chrominance signals utilizing the vertical correlation of an image.

A color camera must generate an output corresponding to red (R), green (G) and blue (B) components of an object. A typical example is a three-tube-type camera comprising one image pickup tube for each component, but this type is undesirable from the viewpoint of economy and compactness. Thus, a system using only one image pickup tube has been proposed.

According to such a system, however, the frequency bands of the R and B signal components should differ from that of the G signal component which essentially determines the horizontal resolution of the image. Therefore, the resolution of the reproduced image is subjected to a restriction even when the frequency bandwidth of the image pickup tube is relatively wide.

An object of the invention is to provide a chrominance signal generator capable of affording a horizontal resolution substantially equal to the frequency band of the image pickup tube.

Another object of the invention is to provide a chrominance signal generator capable of miniaturizing the image pickup device.

A further object of the invention is to provide a monochromatic film for recording the information of an object and generating chrominance signals capable of affording a range of the horizontal resolution substantially equal to responsive frequency range of the monochromatic (black-and-white) film and the image pickup tube.

According to an embodiment of the invention for achieving the above objects, a chrominance signal generator comprises a filter structure of stripe or lattice shape for periodically preventing passage of the light component of at least one color with respect to the horizontal scanning of the image pickup tube in such a manner that the phase of a signal period in said horizontal scanning differs from that for $n$ scanning periods ($n$=1, 2, ...) by $\pi$, a delay circuit for delaying a part of the composite electric signal derived through said filter structure by $n$ horizontal scanning periods, and a signal processing circuit including an adder and a subtractor circuit receiving the output signal of said delay circuit and said composite electric signal, thereby separating the three chrominance signals of red, green and blue components from said composite signal utilizing the vertical correlation of an image.

These and other objects, features and advantages of the invention will become apparent from the following description taken in connection with the accompanying drawings in which:

FIG. 1 shows the optical system of a conventional chrominance signal generator;

FIG. 2 shows conventional striped filter elements to be used in the optical system of FIG. 1;

FIG. 3 shows the frequency spectrum of the output signal of the image pickup tube of FIG. 1;

Figure 7:
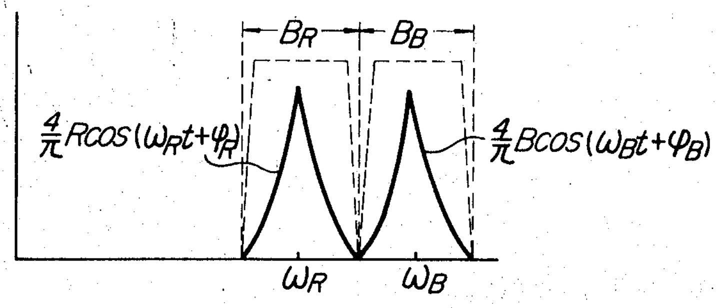
Figure 8:
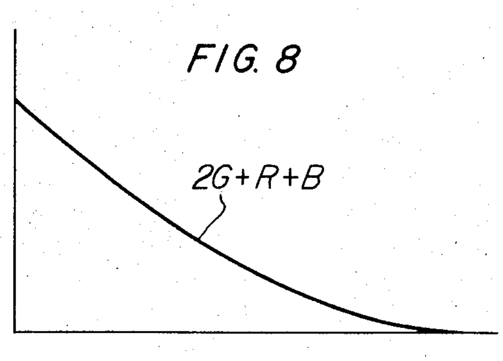
Figure 9:
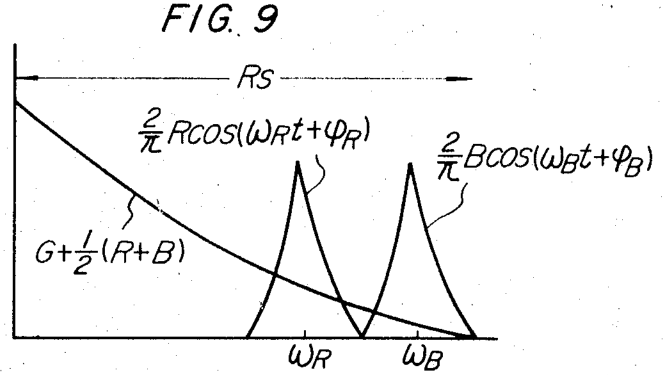
Figure 10:
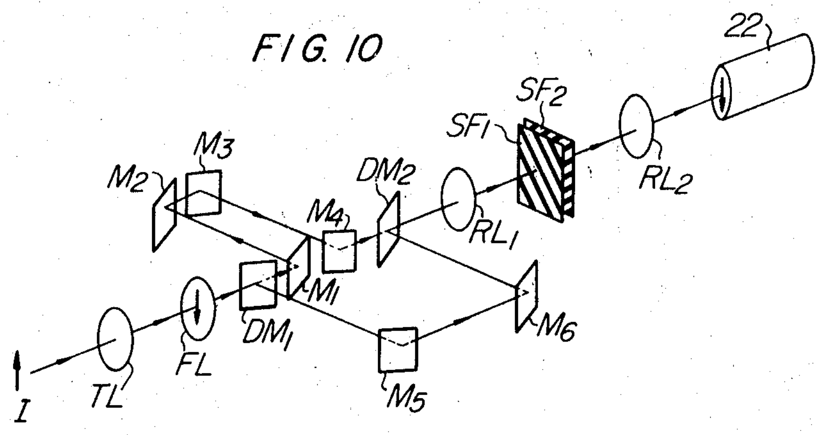
Figures 11, 13:
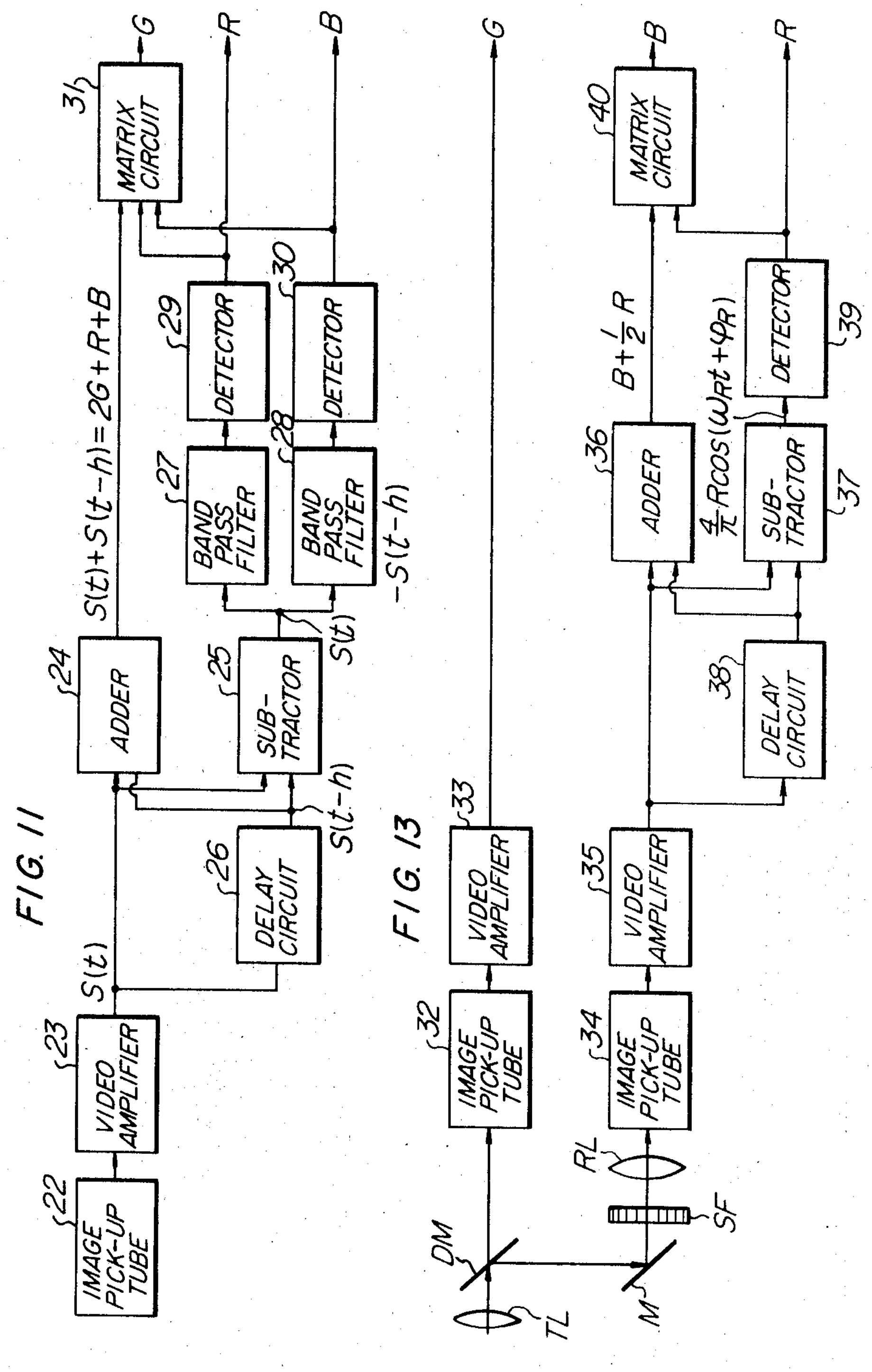
Figure 12:
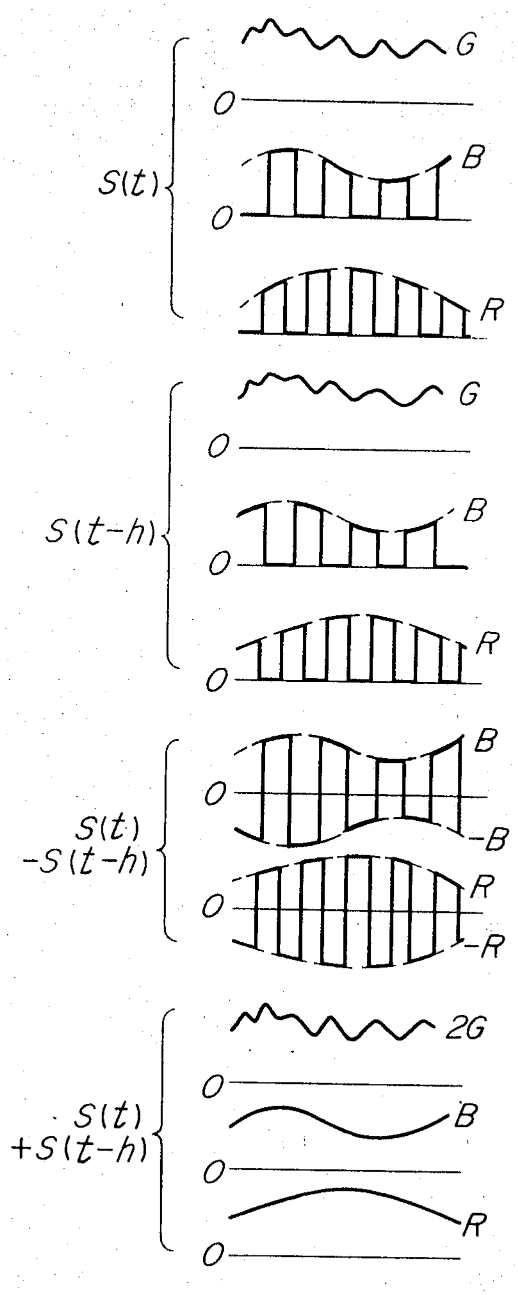
Figures 17, 18, 19:
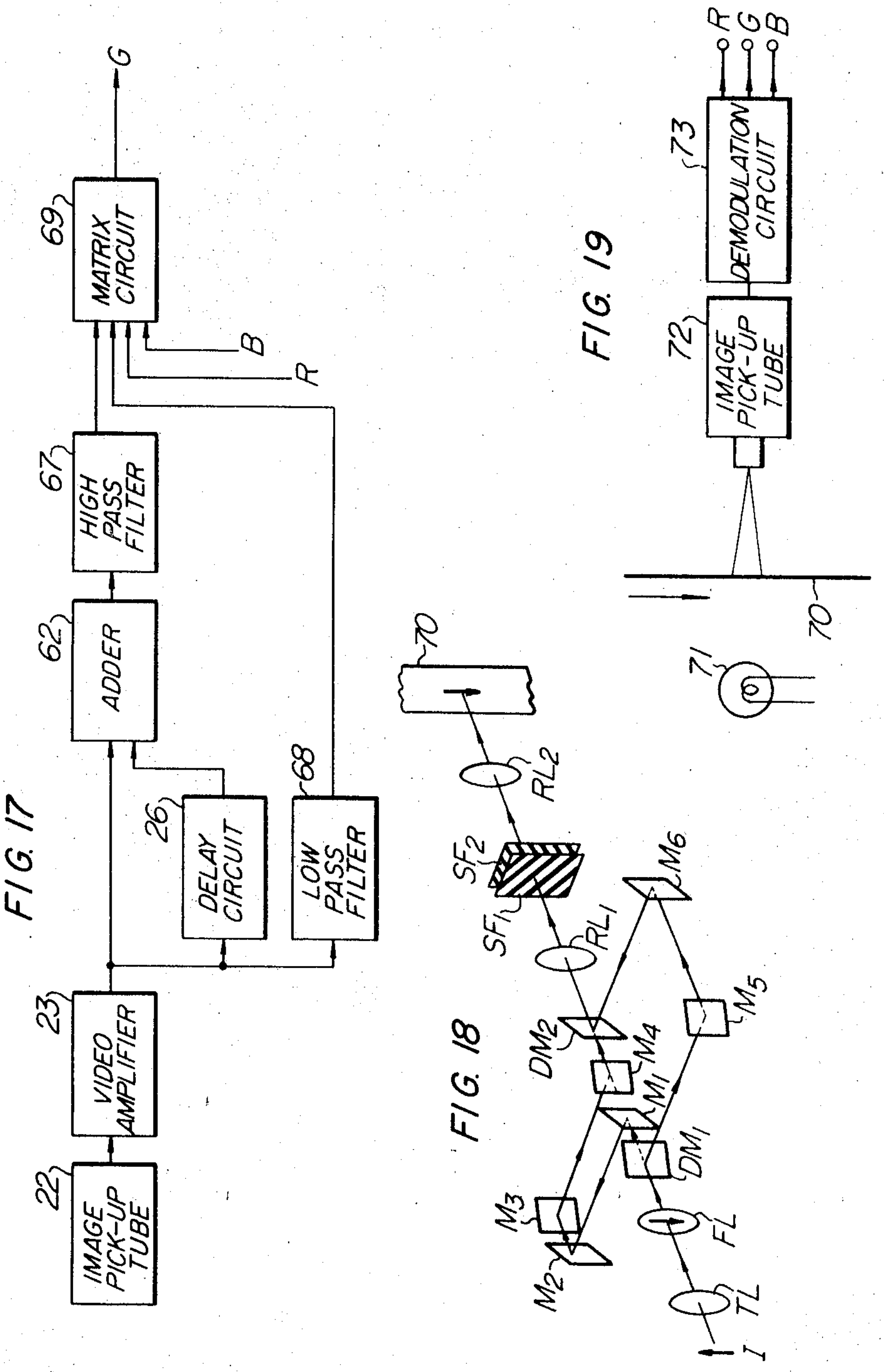

FIGS. 5*a*, 5*b*, 6*a* and 6*b* show various filter structures according to the invention;

FIGS. 7, 8 and 9 are signal spectrum curves for illustrating the principle of the invention;

FIG. 10 shows an embodiment of the optical system of the invention;

FIG. 11 is a block diagram of a signal processing circuit of an embodiment of the invention;

FIG. 12 shows various waveforms detected at various points of the circuit of FIG. 11;

FIGS. 13 to 17 are block diagrams of signal processing circuits of other embodiments of the invention;

FIG. 18 shows an another embodiment of the invention; and

FIG. 19 shows a signal reproducing system of an embodiment of the invention.

As is shown in FIG. 1, the optical system of a conventional chrominance signal generator device of the single image pickup tube type comprises an image pickup tube 1, an object 2, an image forming lens 3 for focusing the object 1 onto striped filter elements 4 and 5, and a relay lens 6 for relaying the image on the filter 4 and 5 to the image pickup tube 1. The striped filter elements disposed in the above system have a structure as shown in FIG. 2. Namely, the striped filter element 4 comprises transparent (R+G+B) stripes 7 and yellow (R+G) stripes 8, disposed alternately. And the striped filter element 5 comprises transparent (R+G+B) stripes 9 and cyanic (G+B) stripes 10 disposed alternately. The image of the object 2 is focused on the image face plate of the image pickup tube 1 through these filter elements and this image is scanned by a scanning beam in a direction substantially normal to the direction of the stripes. Thus, the blue component of the image is periodically interrupted by yellow stripes 8 and red component by cyanic stripes 10 by the filter structure. When the ratios of the width of the transparent and yellow, and transparent and cyanic stripes are selected to be 1:1, respectively, the output signal S($t$) of the image pickup tube 1 can be represented by $$S(t)=G+R\left(\frac{1}{2}+\sum_{n=1}^{\infty}K_n\cos n(n\omega_Rt+\varphi_R)\right)+B\left(\frac{1}{2}+\sum_{n=1}^{\infty}K_n\cos n(n\omega_Bt+\varphi_B)\right)\qquad(1)$$

where, $$K_n=\sin\frac{n\pi}{2}\Big/\frac{n\pi}{2},\qquad \omega_i=\frac{2\pi}{T_i}\ (i=R\text{ or }B),$$

$T_i$ = period needed for scanning one pitch of a striped filter, and $\phi_i$ = phase constant unique to respective striped filter.

However, since the response of an image pickup tube is limited, the terms of $n\geqq 2$ can be assumed negligible. Then, Equation (1) becomes $$S(t)\simeq G+R\left(\frac{1}{2}+\frac{2}{\pi}\cos\,(\omega_Rt+\varphi_R)\right)+B\left(\frac{1}{2}+\frac{2}{\pi}\cos\,(\omega_Bt+\varphi_B)\right)\qquad(2)$$

The frequency spectrum of Equation (2) in shown by the solid line in FIG. 3.

Figure 4:
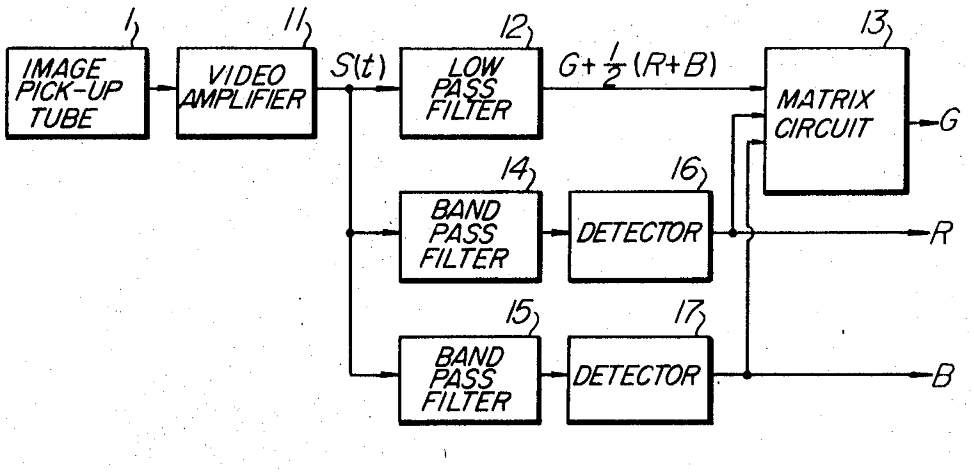
FIG. 4 is a block diagram of a signal processing circuit of a conventional chrominance signal generator.

The three primary chrominance signals of red (R), green (G) and blue (B) are separated from such a composite electric signal by a circuit structure as shown in FIG. 4. In FIG. 4, the output signal S($t$) of an image pickup tube 1 is amplified by a video amplifier 11 and then applied to a low-pass filter 12 and band-pass filters 14 and 15. The low-pass filter 12 allows the component of G+½(G+B) to pass to a matrix circuit 13 and the band-pass filters 14 and 15 having a central frequency $\omega_i$ ($i$=$R$ or $B$) and a bandwidth $B_i$ ($i$=$R$ or $B$) allow only red ($R$) and blue ($B$) component to pass to detectors 16 and 17, respectively. The outputs of the detectors 16 and 17 give red ($R$) and blue ($B$) components respectively which are also applied to the matrix circuit 13. In the matrix circuit 13, red ($R$) and blue ($B$) components of the signal are respectively canceled out to supply only the green ($G$) component. These signals $R$, $G$ and $B$ are, for example, transformed into image signals of NTSC system for further processing.

The horizontal resolution of the image is substantially determined by the frequency bandwidth $B_G$ for the green component. As is shown in FIG. 3, the image pickup tube, however, should respond to the frequency bandwidth of 0 to ($\omega_R$+½$B_R$). If $F_G$=2.8 MHz., $F_B$=$F_R$=10 MHz., $f_B$=3.3 MHz., and $f_R$=4.3 MHz. (where, $F_i=B_i/2\pi, f_i=\omega_i/2\pi$ and $i$=$R$, $G$ or $B$), the image pickup tube should respond to the frequency bandwidth of 0 to $f_R$+½$F_R$=4.8 MHz. Thus, a 1.5-inch vidicon or an image orthicon has been conventionally used to meet the above requirements. Therefore, the size of the camera inevitably becomes large and further the resolution is limited although the response frequency bandwidth of the image pickup tube is wide enough.

According to this invention, the frequency bands of the red ($R$) and blue ($B$) components overlap with that of the green ($G$) component. Nevertheless, the respective components are separated from each other utilizing the vertical correlation of an image based on the fact that the video signals of neighboring horizontal scanning lines resemble each other. Thus, the whole responsive region of an image pickup tube can be used for the $G$ component to achieve a high horizontal resolution or miniaturization of the image pickup tube.

FIGS. 5*a* to 6*b* show specific filter structures used in the inventive device. In FIG. 5*a*, a filter element comprises transparent (R+G+B) regions 18 (white regions) and cyanic (G+B) regions 19 (hatched regions) disposed alternately in both directions. In FIG. 5*b*, a filter comprises transparent (R+G+B) regions 20 (white portions) and yellow (R+G) regions 21 (hatched portions) disposed alternately in both directions. The pitch of the stripes in FIG. 5*a* is arranged to be different from that in FIG. 5*b*. The image focused on the image face plate of an image pickup tube through such filter elements is scanned by a horizontal scanning beam in the direction indicated by the dashed arrows. Successive scanning of $l_1$, $l_2$, $l_3$, . . . produces an output signal, the phase of the carrier wave of which differs by $\pi$ for each pair of neighboring scanning lines. Letters $l_1'$, $l_2'$ . . . indicate the scanning lines of the next field.

Figure 6A:
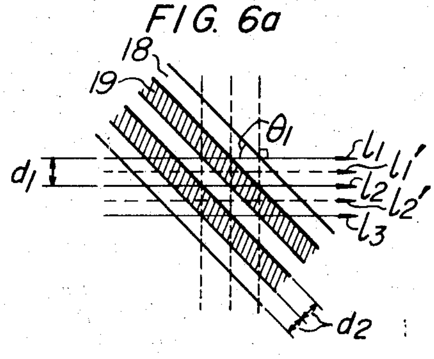
Figure 6B:
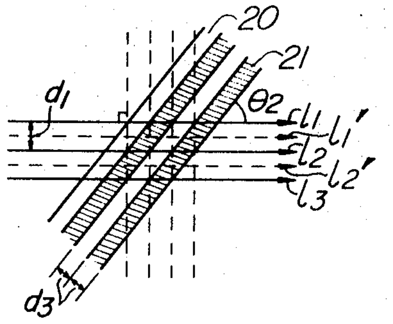

An equivalent effect can be obtained by the filter structure of FIGS. 6*a* and 6*b* in which transparent stripes 18 and cyanic stripes 19 in one filter are slanted by a predetermined angle $\theta_1$ from the vertical direction and transparent stripes 20 and yellow stripes 21 in another filter are slanted by a predetermined angle $\theta_2$. The angles $\theta_1$ and $\theta_2$ are determined by Equation (3).

$$\cos\theta_1=d_2/d_1$$
$$\cos\theta_2=d_3/d_1 \qquad (3)$$

where, $d_1$ = distance between horizontal scanning lines,
$d_2$ = pitch of one filter, and
$d_3$ = pitch of another filter Letting the signal obtained from the image focused through a pair of these filters be represented by S($t$) of Equation (1), the signal for one horizontal scanning period $h$ is $$S(t-h)=G'+R'\left(\frac{1}{2}+\sum_{n=1}^{\infty}K_n\cos(n\omega_Rt+\varphi_R-\pi)\right)$$
$$+B'\left(\frac{1}{2}+\sum_{n=1}^{\infty}K_n\cos(n\omega_Bt+\varphi_B-\pi)\right) \qquad (4)$$

Since the correlation of the image between a pair of scanning lines is very large, we can put $G'\approx G$, $R'\approx R$ and $B'\approx B$. Thus, the difference between $S(t)$ and $S(t$–h) becomes:

$$S(t)-S(t-h)=2R\sum_{n=1}^{\infty}K_n\cos(n\omega_Rt+\varphi_R)$$
$$+2B\sum_{n=1}^{\infty}K_n\cos(n\omega_Rt+\varphi_B) \qquad (5)$$

Neglecting the terms of $n \geqq 2$ from the point of responsive region of the image pickup tube, Equation (5) becomes $$S(t)-S(t-h)=\frac{4}{\pi}R\cos(\omega_Rt+\varphi_R)$$
$$+\frac{4}{\pi}B\cos(\omega_Bt+\varphi_B) \qquad (6)$$

This shows that the subtraction of the signal for one period causes the cancellation of the $G$ component. The frequency spectrum of Equation (6) is shown in FIG. 7.

The sum of Equations (1) and (4) is $$S(t)+S(t-h)=2G+R+B \qquad (7)$$

This shows that the addition of the signal for one period causes the cancellation of modulated terms of $R$ and $B$ components. The frequency spectrum of Equation (7) is shown in FIG. 8. FIG. 9 shows the spectrum of signal $S(t)$ in which $\omega_R$ and $\omega_B$ are selected to lie in the frequency band of the spectrum of Equation (7). As is described above, signals having a spectrum such as shown in FIGS. 7 and 8 can be separated from signal $S(t)$ having a spectrum such as shown in FIG. 9, utilizing the vertical correlation of the image.

Respective $R$ and $B$ components can be separated from the composite signal of Equation (6) by filtering the composite signal by band-pass filters having a central frequency of $\omega_i$ and a bandwidth of $B_i$ (here, $i$=$R$ or $B$) and then detecting the outputs of the filters by detectors. Supplying these $R$ and $B$ components to a matrix circuit, a $G$ component can be provided. $R$, $G$ and $B$ components thus obtained are transformed, for example, into a composite video signal of the NTSC system and then sent out to the receiver side.

FIG. 10 shows an embodiment of the optical system according to the invention, in which an object I is focused on a field lens FL by a lens TL. Dichroic mirrors $DM_1$ and $DM_2$ transmit only the green ($G$) component of the image and reflect all other components. Thus, the green component is transmitted through the dichroic mirror $DM_1$, reflected by reflecting mirrors $M_1$, $M_2$, $M_3$ and $M_4$, transmitted through the dichroic mirror $DM_2$ and then focused by a relay lens $RL_1$ onto striped filters $SF_1$ and $SF_2$. Whereas, red ($R$) and blue ($B$) components of the image on FL are reflected by $DM_1$, reflecting mirrors $M_5$ and $M_6$, and then $DM_2$, and focused by $RL_1$ onto $SF_1$ and $SF_2$. Here, it is arranged that the green component forms a clear image on $SF_1$ and $SF_2$ but the red and blue components form a faded image due to the setting of $M_1$ to $M_6$. By this arrangement, the bands of the $R$ and $B$ components of the image on $SF_1$ and $SF_2$ are limited by a certain quantity to prevent crosstalking upon demodulation. Namely, unless the bands of the $R$ and $B$ components do not overlap, crosstalking occurs upon separation of them by band-pass filters. Thus, the bands of $R$ and $B$ components are preferably limited in the photosignal stage, for example to be ½$B_R$ and ½$B_B$. The image on the striped filters $SF_1$ and $SF_2$ is focused on the image face plate of an image pickup tube 22 by a relay lens $RL_2$. In the above structure, the filter and the image face plate are disposed separately. However, the striped filter may be formed unitarily on the image face plate.

FIG. 11 illustrates an embodiment of the invention, the waveforms at various points of which are shown in FIG. 12. An image is focused on the image pickup tube 22 by an optical system as shown in FIG. 10. The image pickup tube 22 generates an image signal $S(t)$ which is amplified by a video amplifier 23 and then applied to an adder 24 and a subtractor 25 on one hand. On the other hand, this signal $S(t)$ is applied to said adder 24 and subtractor 25 through a delay circuit 26 (the output of which becomes $S(t$–$h)$). Thus, the adder circuit 24 generates an output $S(t)+S(t-h)$ as represented by equation (7) and the subtractor circuit 25 generates an output $S(t)-S(t-h)$/e as represented by equation (6). The output of the subtractor 25 is separated into $R$ and $B$ components by band-pass filters 27 and 28 and is then detected by detectors 29 and 30 to supply $R$ and $B$ signals. These $R$ and $B$ signals are also applied to a matrix circuit 31 together with the output of said adder 24 to provide the $G$ signal. As is stated above, chrominance signals of high horizontal resolution are provided by one image pickup tube. In the above embodiment, the delay time was one horizontal scanning period, but it may be $n$ horizontal scanning periods ($n$: integer) provided that sufficient vertical correlation exists in the image. Further, even when the delay time of the delay circuit 26 has a deviation from one scanning period, demodulation is possible by varying the phase of the carrier wave generated at the filter (specifically, varying the angle of a filter or filters of FIGS. 6a and 6b) to vary the correlated direction from the vertical direction although the quality of the signal (especially the horizontal resolution) becomes more or less inferior. The central frequencies of the band-pass filters 27 and 28 are determined basing upon the pitches of striped filters $SF_1$ and $SF_2$.

FIG. 13 illustrates another embodiment of the invention in which two image pickup tubes are used. In the figure, among the object light beams transmitted through a television lens TL, a green ($G$) component passes through a dichroic mirror DM, is transformed into a green ($G$) signal by an image pickup tube 32 and then is amplified by a video amplifier 33. Components other than green, namely red ($R$) and blue ($B$), are reflected by the dichroic mirror DM and a reflecting mirror M and are focused on a striped filter SF to form an image which is then focused by a relay lens RL onto another image pickup tube 34. As the striped filter SF, one such as shown in FIG. 5a, 5b, 6a or 6b may be used. For example, with a striped filter comprising transparent ($R+G+B$) portions and cyanic ($G+B$) portions, the image pickup tube 34 generates an output comprising a nonmodulated $B$ component and an $R$ component modulated at a frequency corresponding to the pitch of the striped filter SF. This composite chrominance signal of $R$ and $B$ components can be separated in a similar manner as previously described. Namely, the output of the pickup tube 34 is applied to an adder 36 and a subtractor 37 through a video amplifier 35. Whereas the output of the amplifier 35 is also applied to the adder 36 and the subtractor 37 through one horizontal scanning period delay circuit 38. The $R$ signal is provided by detecting the output of the subtractor 37 by a detector 39. This $R$ signal is also applied to a matrix circuit 40 together with the output of the adder 36 to provide $B$ signal at the output of the circuit 40.

According to the above structure, only the $R$ component is under modulation. Therefore, there is no possibility of cross-talking and there is no need for band limitation. Further, a band-pass filter is not necessary before detection. Thus, all the three components of $R$, $G$ and $B$ can utilize the full responsive range of the image pickup tube to provide a high resolution.

Figure 14:
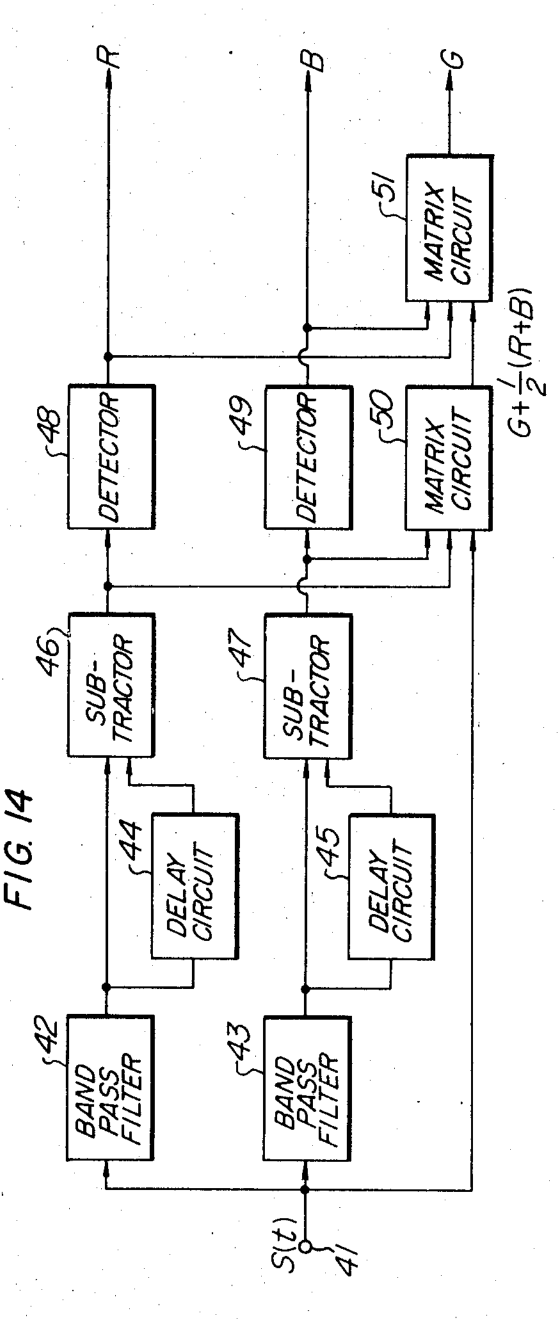

FIG. 14 shows yet another embodiment of the invention in which the output signal $S(t)$ of the image amplifier 23 (FIG. 11) is applied to a terminal 41. Numerals 42 and 43 designate band-pass filters for separating the $R$ and $B$ components (including the $G$ component), respectively, elements 44 and 45 are single horizontal scanning period delay circuits, elements 46 and 47 are subtractors, elements 48 and 49 are detectors, and elements 50 and 51 are matrix circuits.

In this structure, the $R$ and $B$ components separated through band-pass filters 42 and 43 are subjected to the subtraction of the signal before one scanning period to remove the $G$ component mixed therein. Thus, subtractors 46 and 47 supply modulated $R$ and $B$ components, respectively, which are also applied to the matrix circuit 50 together with signal $S(t)$. The $R$ and $B$ components are demodulated by the detectors 48 and 49 to provide demodulated $R$ and $B$ signals which are also applied to the matrix circuit 51 together with the signal $G½(R+B)$ derived from the matrix circuit 50. Thus, matrix circuit 51 can provide a $G$ signal.

The above structure needs two delay circuits, but they may be of narrow band. Especially as a delay circuit for an analog signal such as a video signal, the possibility of using delay circuits of narrow band is very advantageous.

Figure 15:
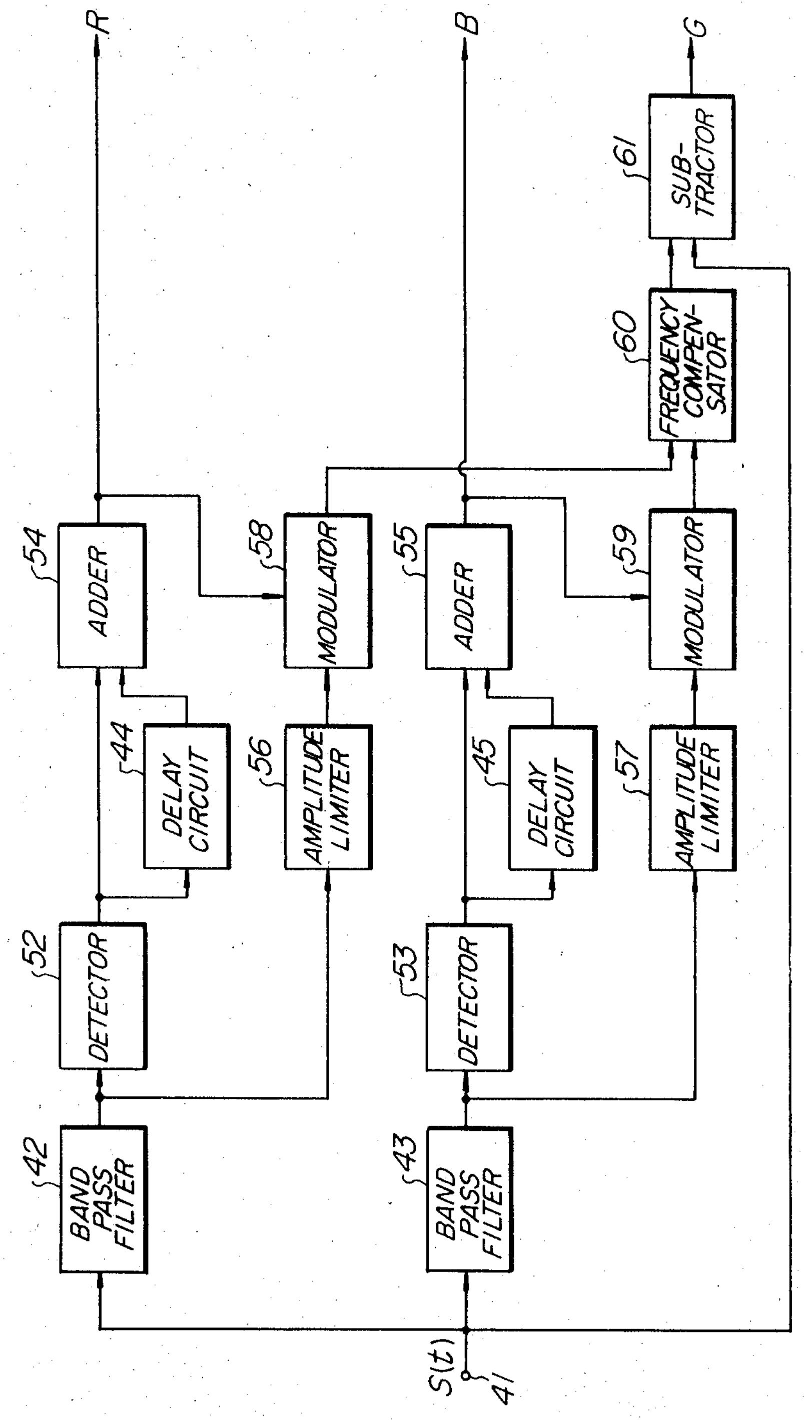

FIG. 15 shows yet another embodiment of the invention, in which numerals 52 and 53 designate detectors, elements 54 and 55 are adders, elements 56 and 57 are amplitude limiters, elements 58 and 59 are modulators, element 60 is a frequency compensator and element 61 is a subtractor. Other numerals 41 and 45 designate similar parts as those of FIG. 14.

In this structure, the respective chrominance signal components are separated at band-pass filters 42 and 43 and detected by detectors 52 and 53. For example, the output $C(t)$ of the band-pass filter 42 is represented by the sum of a modulated chrominance component $2/\pi R\cos(\omega_R t+\phi_R)$ and a non-modulated component (for example, the G component, which is supposed to be represented by $N\cos(\omega_N t+\phi_N)$ in general), namely $$C(t)=\frac{2}{\pi}R\cos(\omega_R t+\varphi_R)+N\cos(\omega_N t+\varphi_N)$$

$$=\sqrt{\left(\frac{2}{\pi}R+N\cos(\Delta nt+\varphi_{\Delta n})\right)^2+\left(N\sin(\Delta nt+\varphi_{\Delta n})\right)^2}\times\cos(\omega_R t+\varphi_R+\Phi) \quad (8)$$

where, $$\Delta n=\omega_N-\omega_R,\qquad \varphi_{\Delta n}=\varphi_N-\varphi_R$$

$$\tan\Phi=\frac{N\sin(\Delta nt+\varphi_{\Delta n})}{\frac{2}{\pi}R+N\cos(\Delta nt+\varphi_{\Delta n})}$$

Thus, the output $D(t)$ of the detector 52 becomes $$D(t)=\sqrt{\left(\frac{2}{\pi}R+N\cos(\Delta nt+\varphi_{\Delta n})\right)^2+\left(N\sin(\Delta nt+\varphi_{\Delta n})\right)^2}$$

$$=\left(\frac{2}{\pi}R+N\cos(\Delta nt+\varphi_{\Delta n})\right)\sqrt{1+\left(\frac{N\sin(\Delta nt+\varphi_{\Delta n})}{\frac{2}{\pi}R+N\cos(\Delta nt+\varphi_{\Delta n})}\right)^2} \quad (9)$$

Supposing $R\gg N$, equation (9) leads $$D(t)\simeq\frac{2}{\pi}R+N\cos(\Delta nt+\varphi_{\Delta n}) \quad (10)$$

Similarly, the output of the detector 52 before one horizontal scanning period becomes $$D(t-h)\simeq\frac{2}{\pi}R-N\cos(\Delta nt+\varphi_{\Delta n}) \quad (11)$$

Thus, the summation of Equations (10) and (11) at the detector 54 produces an output of $$D(t)+D(t-h)=4/\pi R \quad (12)$$

The $R$ component is thus provided. The $B$ component can also be provided in a similar manner.

Equation (10) becomes invalid when $R$ becomes small ($R>>N$ does not hold). Yet, this can be prevented with an arrangement that the carrier wave of the $R$ component exists even when the $R$ component becomes small (this is also the case with the $B$ component). For the above purpose, a uniform white light is injected from a light source into the optical system of FIG. 10 with a half mirror disposed between FL and $DM_1$.

At the amplitude limiter 56, only the carrier wave component of signal $C(t)$ is detected to modulate the $R$ component derived from the adder 54 at the modulator 58. The modulator 58 is a switch acting in synchronism with the output of the amplitude limiter 56 and produces an output of $$M_R(t)=R\left(\frac{1}{2}+\sum_{n=1}^{\infty}K_n\cos(n\omega_R t+\varphi_R)\right) \quad (13)$$

Similarly, the modulator 59 for the blue component produces an output of $$M_B(t)=B\left(\frac{1}{2}+\sum_{n=1}^{\infty} K_n \cos(n\omega_R t+\varphi_B)\right) \quad (14)$$

Thus the subtractor 61 applied with the sum of $M_R(t)$ and $M_B(t)$ and signal $S(t)$ gives an output of $$S(t)-[M_R(t)+M_B(t)]=G \quad (15)$$

The frequency compensator 60 limits the region of $n$ in $M_R(t)$ and $M_B(t)$ since $n$ has a finite upper limit (for example, 1) unique to the image pickup tube. The detectors 52 and 53 may be envelope detectors and have the identical central frequency as band-pass filters 42 and 43. Further, the separation of the signal can be improved by detecting only the carrier wave by a band-pass filter of a narrow band and achieving synchronous detection with the reference set at the carrier wave.

Two delay circuits are also necessary in the above structure, but they may be of narrow band. Further, the signal after detection (low-frequency components) is delayed and processed at the subtractor. Therefore, the tolerance in delay time is advantageously large.

Figure 16:
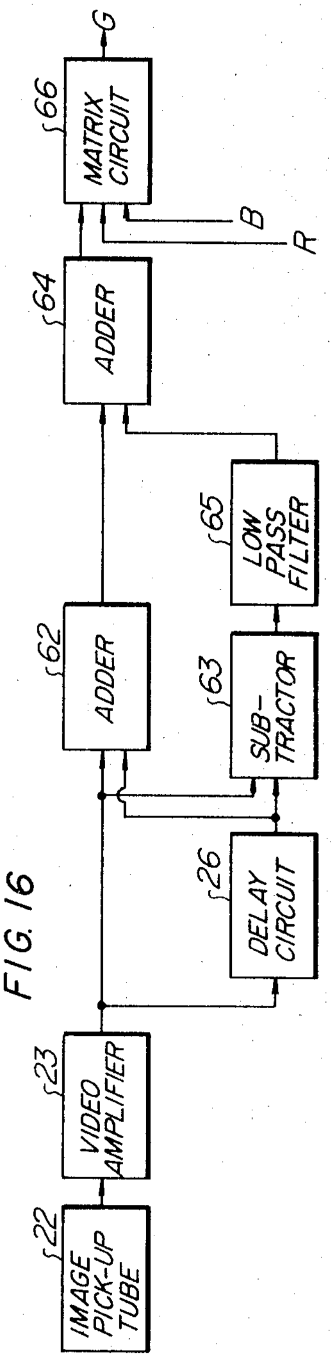

FIG. 16 shows another embodiment of the invention, in which numerals 62 and 64 designate adders, 63 a subtractor, and 66 a matrix circuit. Other numerals 22, 23, 26 correspond to those of FIG. 11. In the embodiment of FIG. 11, the G signal available therefrom is of wide band so that the horizontal resolution is high. But since the G signal is formed by summing two adjacent horizontal scanning lines, the vertical resolution becomes half. This embodiment of FIG. 16 intends to increase the vertical resolution. Namely, the assumption of $G \approx G'$ in the derivation of Equation (5) is removed and their difference is marked. (However, as for $R$ and $B$, since only faded images of $R$ and $B$ components are used in the optical system of FIG. 10 for the purpose of band limitation, the assumption of $R \approx R'$ and $B \approx B'$ still hold in this case.) Then the output of the subtractor 63 is $$S(t)-S(t-h)=G-G'+2R\sum_{n=1}^{\infty} K_n \cos(n\omega_R t+\varphi_R)$$

$$+2B\sum_{n=1}^{\infty} K_n \cos(n\omega_B t+\varphi_B) \quad (16)$$

The low-pass filter 65 removes modulated $R$ and $B$ components from this output and gives $$[S(t)-S(t-h)]=[G-G'] \quad (17)$$

here, the angled parentheses [] indicate the low-frequency component. Whereas, the adder 62 gives an output of $$S(t)+S(t-h)=G+G'+R+B$$
$$=[G+G']+[G+G']^*+R+B \quad (18)$$

here, the angled parentheses with asterisks [ ]* indicate the high-frequency component. Thus, the adder 64 applied with these signals gives an output of $$E(t)=[G-G']+[G+G']+[G+G']^*++R+B$$
$$=[2G]+[G+G']^*+R+B \quad (19)$$

This $E(t)$ is then applied to the matrix circuit 66 together with $R$ and $B$ signals derived from such circuits as shown in FIG. 11, 14 or 15 to generate an output of $$V(t)=(G)+\frac{1}{2}(G+G')^* \quad (20)$$

As is clear from Equation (20), the vertical resolution of the low-frequency component is not injured although that of the high-frequency component is reduced to half. Thus, this embodiment provides a higher vertical resolution than the embodiment of FIG. 11.

FIG. 17 shows another embodiment for improving the vertical resolution, in which numeral 67 designates a high-pass filter, element 68 is a low-pass filter and element 69 is a matrix circuit. Numerals 22, 23, 26 and 62 designate similar parts as designated by similar numerals in FIG. 16. In FIG. 17, the adder 62 generates an output represented by Equation (18) which is passed through the high-pass filter 67 to become $$[S(t)+S(t-h)]^*=[G+G']^* \quad (21)$$

Whereas the low-pass filter 68 applied with the output ($S(t)$ of Equation (1)) of the video amplifier 23 gives $$(S(t))=(G)+\frac{1}{2}(R+B) \quad (22)$$

Signals of Equations (21) and (22) and $R$ and $B$ signals derived from such circuit as shown in FIG. 11, 14 or 15 are applied to and processed in the matrix circuit 69 to give an output of $$X(t)-(G)+\frac{1}{2}(G+G')^* \quad (23)$$

Thus, a similar $G$ signal to that of Equation (20) is provided.

In the above embodiments, an object is directly imaged on an image pickup tube and $R$, $G$ and $B$ signals are provided by appropriately processing the output of the tube. Now, description will be made of an embodiment in which an object is first recorded in a monochromatic film and then $R$, $G$ and $B$ signals are derived from such a film.

FIG. 18 shows such an embodiment of the invention utilizing a monochromatic film for recording chrominance signals. In the optical system of FIG. 18, an object I is focused by a television lens TL onto a field lens FL. Dichroic mirrors $DM_1$ and $DM_2$ transmit a green component and reflect other components. Thus, the green ($G$) component of the image on FL passes through $DM_1$, is reflected by reflecting mirrors $M_1$, $M_2$, $M_3$ and $M_4$, passes through $DM_2$ and then is focused by a relay lens $RL_1$ onto striped filters $SF_1$ and $SF_2$ to form an image. Other components, namely the red ($R$) and the blue ($B$) components, are reflected by $DM_1$, then by reflecting mirrors $M_5$ and $M_6$ and further by $DM_2$, and focused by $RL_1$ onto $SF_1$ and $SF_2$. The disposition of mirrors $M_1$ to $M_6$ is so arranged that the $G$ component forms a clear image on $SF_1$ and $SF_2$, but that $R$ and $B$ components form a faded image to prevent crosstalking upon detection. Namely, when the bands of $R$ and $B$ components overlap each other, crosstalking occurs upon their separation by band-pass filters. Accordingly, the bandwidths of $R$ and $B$ components are preferably limited to $\frac{1}{2}B_R$ and $\frac{1}{2}B_B$ in the photosignal stage. The image on the striped filters $SF_1$ and $SF_2$ is focused on a monochromatic film 70 by a relay lens $RL_2$ to form an image. Here, the film 70 can be placed contiguously behind the striped filter $SF_2$.

Thus, the monochromatic image with chrominance information of an object can be stored in a monochromatic film. The chrominance information stored in a monochromatic film can be reproduced with an arrangement such as shown in FIG. 19.

In FIG. 19, the image in the monochromatic film 70 receives light rays from a light source 71 and is imaged on an image pickup tube 72 (otherwise, a monochromatic flying spot scanner can be used in place of the source 71 and the image pickup tube). The output signal of the image pickup tube 72 is fed to a demodulation circuit 73 to provide respective $R$, $G$ and $B$ signals.

What is claimed is:

1. A chrominance signal generator comprising: at least one color filter structure having subtractive primary color portions; means for scanning and transforming informations supplied from an image through said filter structure into a composite electrical signal wherein the frequency bands of two primary color components overlap with that of the third primary color component; delay circuit means for partially delaying the output of said transforming means, signal processing circuit means for processing the output of said delay circuit means and the output of said transforming means to provide individual chrominance signals; said filter structure including means for preventing passage of a light component of at least one color periodically with respect to the scanning direction, the phase of said period differing from that for $n$ horizontal scanning periods by about $\pi$ (where $n$ is a positive integer), said delay circuit means having a delay time that is $n$ times one horizontal scanning period, whereby said plurality of individual chrominance signals are separated from a composite electric signal utilizing the vertical correlation in the image.

2. A chrominance signal generator according to claim 1, in which said filter structure comprises two color filter elements of lattice shape, said filter elements preventing periodically red and blue light components, respectively.

3. A chrominance signal generator according to claim 1, in which said filter structure comprises a plurality of striped filters, the relative angles of which according to said scanning direction are variable.

4. A chrominance signal generator according to claim 1, in which said filter structure has a lattice-shaped pattern wherein each pair of adjacent scanning lines produces signals having a difference of $\pi$ in their phase, and said delay circuit means has a delay time of one horizontal scanning period.

5. A chrominance signal generator according to claim 1, in which: said filter structure comprises a first filter element capable of transmitting green and blue components and preventing passage of a red component periodically and a second filter element capable of transmitting green and red components and preventing passage of the blue component periodically; and said signal processing circuit comprises at least an adder and a subtractor for carrying out summation and subtraction of the outputs of said transforming means and said delay circuit means, first and second band-pass filters connected to the output of said subtractor for separating the red and blue components from the output of said subtractor respectively, first and second detectors connected to the outputs of said band-pass filters to form red and blue signals respectively, and matrix circuit means for supplying a green signal from the output of said adder and from said red and blue signals.

6. A chrominance signal generator according to claim 1, in which red and blue components are detected through said filter structure by said transforming means and the green component is detected through another transforming means.

7. A chrominance signal generator according to claim 1, in which said signal processing circuit comprises an adder circuit and a subtractor circuit for carrying out summation and subtraction of both the outputs of said transforming means and said delay circuit means, a low-pass filter for deriving the low-frequency component from the output of said subtractor circuit, and another adder circuit for adding the output of said low-pass filter to the output of said adder circuit, thereby improving the resolution in a direction perpendicular to said scanning direction.

8. A chrominance signal generator according to claim 1, further comprising a low-pass filter for deriving the low-frequency component from the output of said transforming means, said signal processing circuit comprising an adder for summing the output of said transforming means and the output of said delay circuit means, and a high-pass filter for deriving the high-frequency component from the output of said adder, thereby to improve the resolution in a direction perpendicular to said scanning direction by summing the outputs of said low-pass filter and said high-pass filter.

9. A chrominance signal generator according to claim 1, further comprising band-pass filters for deriving signal components of a desired band from the output of said transforming means.

10. A chrominance signal generator according to claim 1, wherein said transforming means includes means for recording informations supplied through said filter structure in a monochromatic film and for photographing the information in the film by a image pickup device.

11. A chrominance signal generator according to claim 1 wherein said filter structure comprises two color filter elements of lattice shape, the pitch of the two filter elements being respectively different, the filter members in each lattice-shaped filter element being disposed in a checkerboard pattern.

12. A chrominance signal generator according to claim 1 wherein said filter structure comprises a pair of striped filters disposed at angles $\theta_1$ and $\theta_2$ relative to the scanning direction, wherein $$\cos \theta_1 = d_2/d_1$$
$$\cos \theta_2 = d_3/d_1$$

and where $d_1$ is the distance between adjacent scanning lines, $d_2$ is the pitch of the stripes of one filter element and $d_3$ is the pitch of the stripes of the other filter element.

13. Method for recording chrominance informations of an object for generating chrominance signals in a monochromatic film through at least one filter structure, comprising preventing passage of a light component of at least one color from the object periodically with respect to the scanning direction in such a manner that the phase of said period differs from that for $n$ horizontal scanning periods by about $\pi$ (where $n$ is a positive integer).

* * * * *